United States Patent [19]

Vaussanvin

[11] 4,203,357
[45] May 20, 1980

[54] OSCILLATING COOKING APPARATUS

[75] Inventor: Marcel Vaussanvin, Tournus, France

[73] Assignee: Manufacture Metallurgique de Tournus, Tournus, France

[21] Appl. No.: 39,947

[22] Filed: May 17, 1979

[30] Foreign Application Priority Data

Jan. 9, 1979 [FR] France .................................. 79 01165

[51] Int. Cl.² ........................ A47J 37/04; A47J 37/12
[52] U.S. Cl. ......................................... 99/340; 74/32; 99/348; 99/409; 99/421 H; 99/423; 99/427; 99/443 R; 99/447; 219/389; 219/405; 366/237
[58] Field of Search ............................ 74/32; 366/237; 219/389, 438, 214, 405, 411; 99/348, 447, 403, 423, 340, 339; 409, 427, 421 H, 443 R

[56] References Cited

U.S. PATENT DOCUMENTS

| 3,635,150 | 1/1972 | Piedallu | 99/348 |
| 3,688,684 | 9/1972 | Piedallu | 99/348 |
| 3,805,687 | 4/1974 | Klundert | 99/423 X |
| 3,807,292 | 4/1974 | Cinter | 99/348 |
| 3,870,193 | 3/1975 | Schneider | 99/443 R |
| 3,938,497 | 2/1976 | Andrassy | 99/423 X |
| 4,073,225 | 2/1978 | Lang-Ree | 99/339 |
| 4,114,523 | 9/1978 | Eff | 99/340 |
| 4,137,835 | 1/1979 | Petersen | 99/348 |

*Primary Examiner*—Billy J. Wilhite
*Attorney, Agent, or Firm*—Dennison, Dennison, Meserole & Pollack

[57] ABSTRACT

A cooking device including an open topped vessel having a prismatic form and a polygonal base which is mounted for rotation about a horizontal axis parallel to its length. Motor means for oscillating the vessel in a rocking motion about the axis and a heat source is fixedly mounted above the vessel.

9 Claims, 6 Drawing Figures

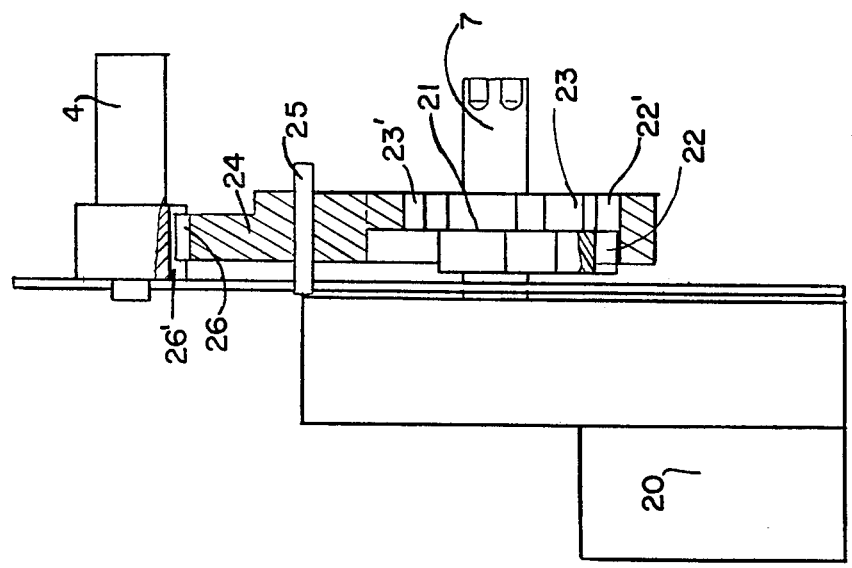
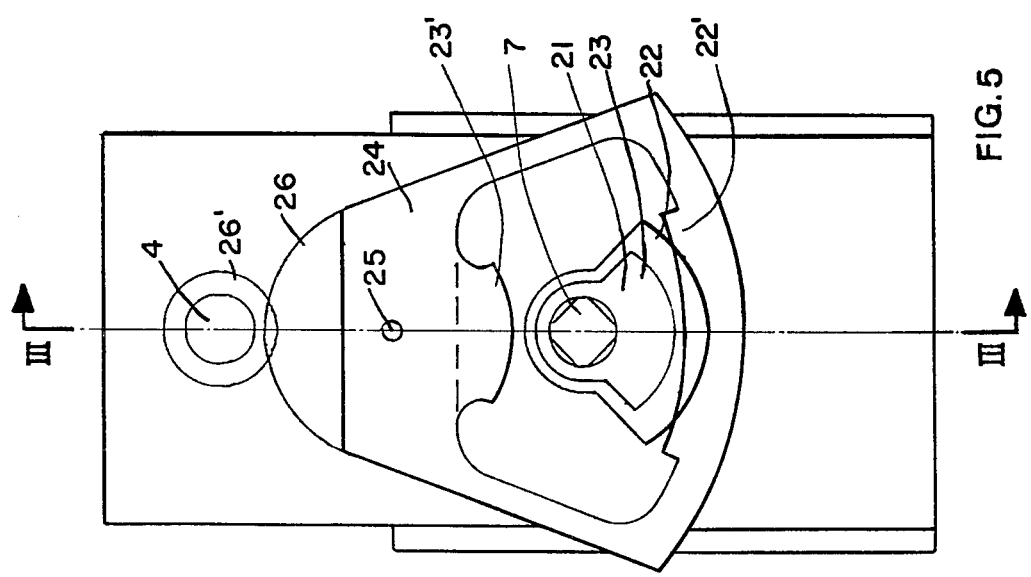

OSCILLATING COOKING APPARATUS

The present invention concerns a device for grilling, frying or braising of foods.

The cooking and reheating of foods is customarily done in an utensil such as a casserole, a frying pan, a saucepan, etc. which is placed on a heat source where it must be monitored and stirred from time to time in order to avoid sticking and to spread the heat in the mass.

Uniform cooking can be maintained without manual intervention for example by using a rotisserie with a turning roasting spit which turns the product so that different surfaces are successively opposite the heat source. But a spit can be used only for certain foods which can be carried on the spit or held in place in the course of the rotation of the spit.

French Pat. No. 2,140,851 discloses a device for frying of food cut up in small pieces in the form of a rotating drum which is designed to receive the foods and a thermal radiation element mounted within the drum. Rotation of the drum causes random movement of the food in the area of the heat radiation where it is thus cooked uniformly.

Use of the drum makes the apparatus poorly accessible and complicates the filling and emptying operations as well as the cleaning operation. Also the heat source is within the drum and even if it is protected by a deflector, pieces of food or fat falling on the heat source or its protector can cause smoke and disagreeable odors.

U.S. Pat. No. 4,073,225 of Feb. 1, 1978, discloses a continuously oscillating cooking device for meat balls, but this device includes the following inconveniences: with the transfer time of the products being fixed by the geometry of the device and the nature and form of the products, the cooking time is independent of the quality of the products in the apparatus. This is variable according to the source and the previous preparation and storage conditions, which results in variations of degree of cooking of the food, which are not adjustable as desired.

Further, for turning of the cooking foods, because it necessitates a large number of turns in order to avoid burning of one surface which is exposed more than others, and because the forward movement is provided by a system of baffles, so that each morsel of food moves forward at each rocking movement, the device is of necessity very long. This arrangement may be suitable for cooking large quantities of food, but it could not be sufficiently reduced for domestic use.

The object of the present invention is to remedy these inconveniences while retaining the principle of successive exposure of the surfaces of the food to the heat source, in order to assure uniform cooking without monitoring. The disclosure resides essentially in the shape of the container which is used, its position relative to the heat source, the particular arrangement or mounting of this heat source, and the device to produce the oscillations.

The device according to the invention is constituted of a stationary heat source situated above an open receptacle to receive the food, which is subjected to a periodic rocking movement around an essentially horizontal axis.

With the rocking movement, the food successively and randomly presents its different surfaces before the heat source, thus permitting uniform cooking without monitoring. The rocking movements are limited such that the food pieces cannot overflow from the receptacle but must be sufficiently great that the food pieces can slide, roll and/or rock on the base. The maximum rocking angle is therefore generally between 30° and 90° in relation to the horizontal.

Form of the receptacle: the receptacle which has a generally prismatic form on a polygonal base, curvilinear or not, or both (or with rounded angles), of which the generating lines are parallel to the rocking axis, includes a base opposite the top opening which has the general form of an inset dihedron, of which the angle is preferably between 200° and 185°. It can also include low profile ribs, grooves or open cells, which are generally rounded. These ribs, grooves or cells play a double role. First, they prevent sticking of food on the base and second they contribute to improving the presentation of all surfaces of the food to the heat source to provide uniform cooking. In the case of grooves or ribs, they are preferably arranged either parallel to the rocking axis or in chevrons with axes perpendicular to the rocking axis. The relationship of the overall height of the receptacle H to its maximum width l is preferably between $\frac{1}{4}$ and 1.

The receptacle can be coated on the inside or outside in a known manner with suitable materials such as antistick coating, enamel, etc. It can be stationarily mounted on its rocking axis (or not). This last case is preferable for ease of mounting and dismounting when starting or finishing cooking, as well as for cleaning of the receptacle. If the receptacle is stationary, the stop at one end rocking position facilitates discharge with the aid of a spatula or a spoon, etc.

Heat source: heating means to be used can be of very different types, for example, flame(s) or braising, electrical resistance, infrared radiation, microwave emission, or hot pulsating air. If microwave heating is used, the drum would be of nonreflecting material, for example ceramic or plastic material, but not metal. The heat source is situated over the receptacle opening, thus there is no risk of contact between the foods or the fat drippings and the heat source. However, more efficiency is realized when the heat source consists of two heating or emitting sheets which are essentially planar and essentially parallel to the surface of the foods in the positions in which they are found at the extremes of the rocking movement. For cooking french fried potatoes, for example, this angle is equal to approximately 30°. Moreover, in the case of heating by indirect radiation with a reflector device, the center of the focal zone is found in the immediate vicinity of the rocking axis.

The small size of domestic rooms, particularly kitchens, makes the use of multipurpose devices very attractive. The mechanism according to the invention thus allows simultaneous rotary movement and rocking movement at the same time on two parallel axes, and consequently the use as desired of one or the other of these as drive axis, as needed. This device is of simple and strong construction. It is characterized in that the motor axis has a double pinion including two toothed sectors situated on the same side in relation to the motor axis, which mesh successively in the course of one rotation in two opposite sectors in relation to the motor axis, integral with a movable balance beam on one axis, which is situated outside of the circle swept by the double pinion.

This balance beam can include another toothed section concentric to the rocking axis which meshes in turn on a gear which is integral with the oscillating discharge axis.

In another embodiment, the rocking movement can be undertaken directly on the balance beam.

The plane of the parallel axes, motor axis and axis of the balance beam constitutes a plane of symmetry of the motions of the device. The relative dimensions of the different elements fix the angle of maximum incline of the cooking receptacle. The assembly can also comprise a system to halt the rocking in a predetermined position in a known manner.

The invention is to be better understood by the following description of one preferred embodiment, and by the drawings wherein:

FIG. 5 is an end elevation of the rocking device assembly; and

FIG. 6 is a partial sectional view taken along line III—III of FIG. 5.

Figure 2:
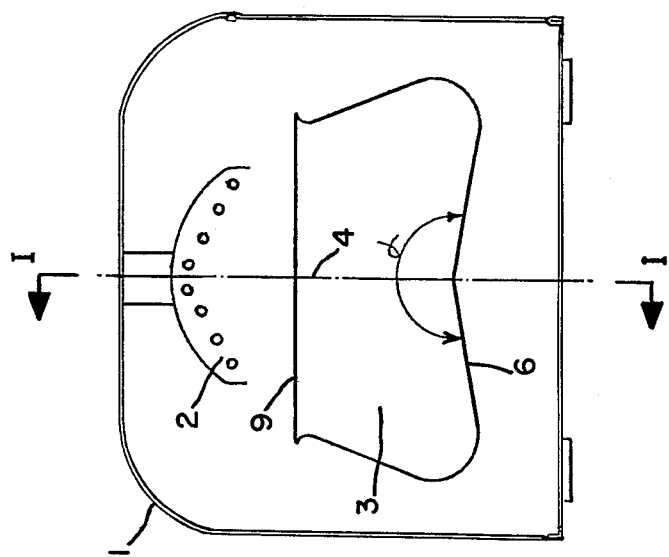
FIG. 2 is a section taken from the end along line II—II of FIG. 1.
Figure 1:
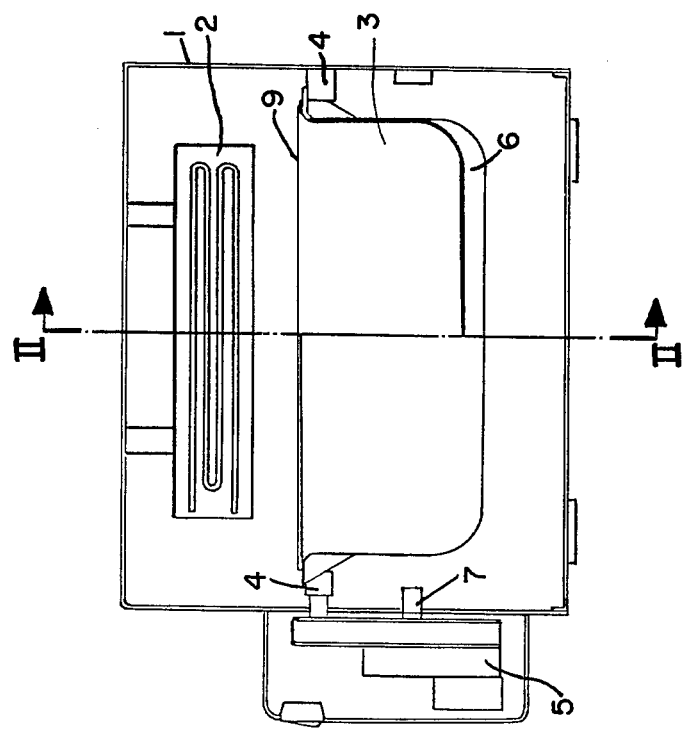
FIG. 1 is a front section of the device taken along line I—I of FIG. 2.
Figure 4:
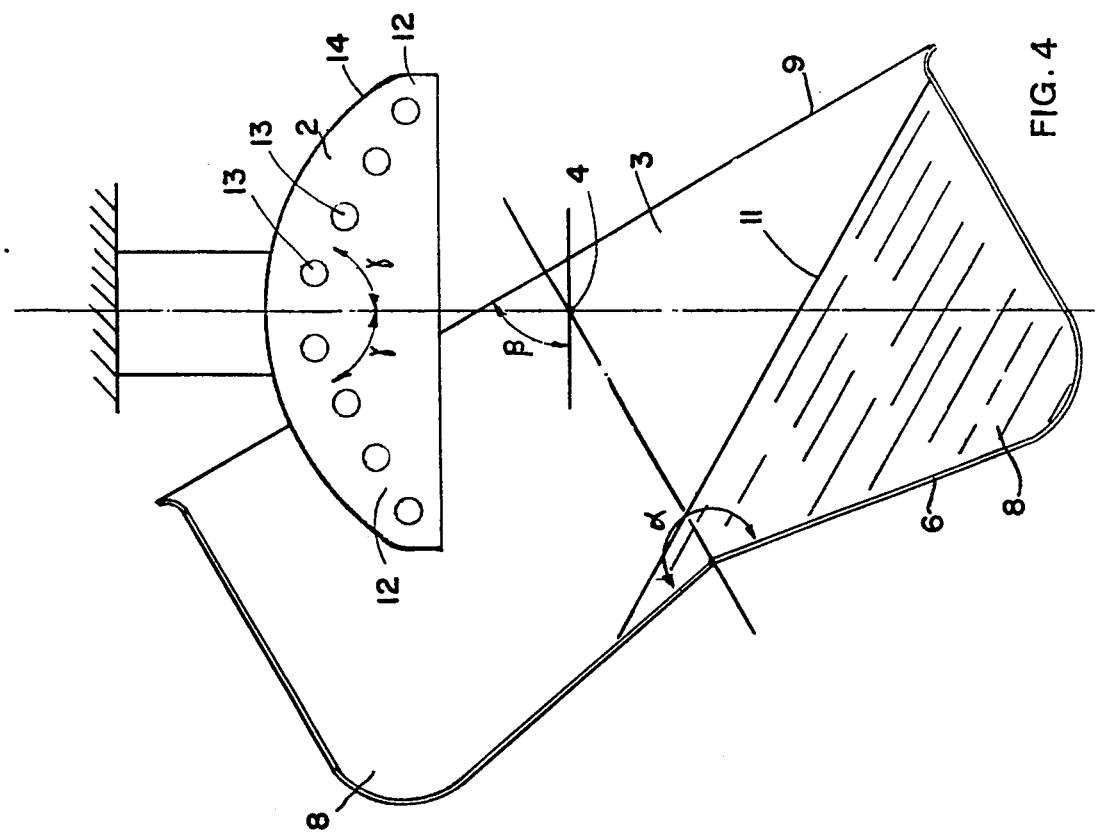
FIG. 4 is an enlarged section of the heating components and the receptacle.

The apparatus includes a frame 1 forming a hood on which is mounted the heating source 2, over the opening 9 of a receptacle 3 which may be fixed or movable about an axis 4 which is essentially horizontal and is of particular form to be described hereinafter.

The receptacle is intended to receive the foods to be cooked and is moved about its axis 4 with a rocking movement of a certain amplitude determined with the aid of a suitable power device 5. This device also has an output axis 7 in continuous rotation which can also be used for other purposes, as for example a rotisserie.

Receptacle 3 has a generally prismatic form and wherein the generating lines are parallel to the rocking axis 4 and which has a polygonal base, with rectilinear and/or curvilinear sides, and preferably rounded angles, to present a base 6 opposite the top opening 9, having the general form of an inset dihedron of which the angle $\alpha$ is between 185° and 200°.

Figure 3:
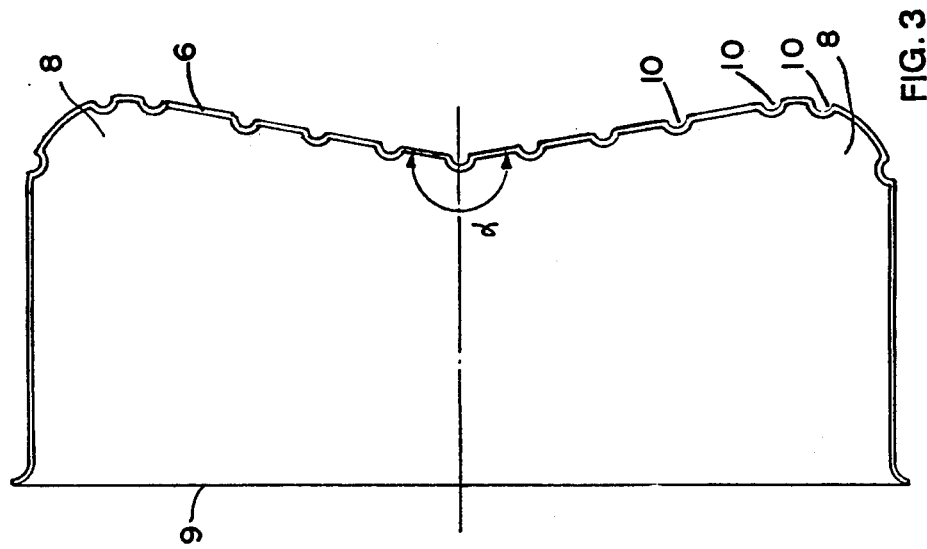
FIG. 3 is a cross section of a cooking receptacle used in the invention.

In a preferential embodiment, base 6 is provided with ribs 10 as seen in FIG. 3 of essentially semicylindrical form and parallel to axis 4 and arranged equidistant from each other except in the vicinity of the rounded edge 8 where they are close together.

The heating device may be made up of sheathed electrical resistances 13 arranged in two rows 12 and 12' which are essentially planar and are symmetrical in relation to a vertical plane passing through axis 4 and forming an angle $\gamma$ with it. In a preferred embodiment, these rows are essentially parallel to the surface of the foods 11 in the extreme rocking positon $\beta$ of receptacle 3. In the case of french fried potatoes, the angles $\beta$ and $\gamma$ are equal to approximately 30°.

This heating device is completed by a reflector 14 of generally cylindrical form, above and in the vicinity of the heating resistances 13, and of which the center of curvature is situated near axis 4.

The rocking device includes a geared-down electric motor assembly 20 which drives output shaft 7 in continuous rotation at low angular velocity, for example between 0.1 and 10 rpm.

This shaft carries a double pinion 21 having two toothed sections 22 and 23 which mesh successively with the two toothed sections 22' and 23' of the balance beam 24 which is movable around a shaft 25. Balance beam 24 has a toothed segment 26 which is coaxial with the axis of shaft 25 and which meshes with the gearing 26' integrally and concentrically with the rocking shaft 4.

The ends of shafts 4 and 7 are provided with common drive connections relative to receptacle 3 and to the spit of the optional rotisserie, not shown.

The device according to the invention may be used for grilling, frying or braising of foods of any nature, particularly meats or vegetables, of various sizes and forms, with or without addition of fat. It is particularly useful for the preparation of light fried potatoes without immersion in oil or other fatty substance in liquid state.

I claim:

1. An oscillating cooking apparatus comprising, a fixed frame, a heat source mounted adjacent the top of said frame, an open-topped receptacle for holding food to be cooked, means on said frame mounting said receptacle for free rotation about its longitudinal horizontal axis below said heat source, said receptacle being of prismatic form and having a polygonal base in the form of an inset dihedron, and means for oscillating said receptacle in a rocking motion about said axis.

2. Cooking apparatus as defined in claim 1, wherein the angle of the inset dihedron is between 185° and 200°.

3. Cooking apparatus as defined in claim 1, wherein the base of the receptacle is provided with longitudinally extending ribs, said ribs being rounded.

4. Cooking apparatus as defined in claim 1, wherein the heat source comprises a plurality of heaters arranged in two sets, the sets being angularly disposed with respect to each other at an angle so that each set is parallel to the free surface of food in the receptacle at the extreme ends of oscillation.

5. Cooking apparatus as defined in claim 4 wherein the angle between the heater sets is about 30°.

6. Cooking apparatus as defined in claim 4 and further including a curved reflector mounted above said heaters, the center of curvature thereof being in the immediate vicinity of the longitudinal horizontal axis of said receptacle.

7. Cooking apparatus as defined in claim 1, wherein said means for oscillating said receptacle is a geared motor and further including an auxiliary power output shaft for rotation of a spit.

8. Cooking apparatus as defined in claim 7 and wherein said motor has a primary output shaft, a pair of different diameter sector gears mounted coaxially on said primary output shaft, a balance beam mounted for rotation on said frame, said beam having a cut-away portion within which said gears are received, a first internal arcuate rack on the lower border of the cut-away portion, a second internal arcuate rack on the upper border of the cut-away portion, said racks meshing with the respective gears, means interconnecting said balance beam to said receptacle so that oscillatory motion of the balance beam will cause an opposite oscillatory motion of said receptacle.

9. Cooking apparatus as defined in claim 8 wherein the angle of oscillation of the receptacle in each direction is between 30° and 90°.

* * * * *